April 10, 1962    J. W. THIEME    3,028,877
PRESSURE AND FLOW CONTROL VALVE
Filed May 2, 1957    2 Sheets-Sheet 1

JOHN W. THIEME
INVENTOR.

Huebner, Beehler & Worrel.
BY
ATTORNEYS.

April 10, 1962 J. W. THIEME 3,028,877
PRESSURE AND FLOW CONTROL VALVE
Filed May 2, 1957 2 Sheets-Sheet 2

JOHN W. THIEME
INVENTOR.

Huebner, Beehler, & Worrel.
BY
ATTORNEYS.

United States Patent Office 3,028,877
Patented Apr. 10, 1962

3,028,877
PRESSURE AND FLOW CONTROL VALVE
John W. Thieme, 735 E. Compton Blvd., Rte. 1,
West Compton, Calif.
Filed May 2, 1957, Ser. No. 656,617
9 Claims. (Cl. 137—509)

This invention relates to valve devices and has particular reference to a proportioning or fractional distributing hydraulic valve mechanism whereby a supply needing hydraulic pressure of a relatively low amount or in fact of any one of a wide scale of intermediate amounts can be drawn from a source of hydraulic pressure which may be a great many times higher than the pressure sought to be used.

In making use of hydraulic pressure for operating sundry hydraulic motors having different demands, the problem which has been encountered is one of being able to make use of a single high pressure source of hydraulic liquid in order to have it serve as a source of supply for more than one hydraulic motor wherein the different motors are such that they must operate at very different pressures. The most common expedient heretofore resorted to and in fact the only commercial expedient currently in practice is to provide a manifold of such nature that each separate bleed or take-off must have its own separate control and separate gaging means in order to have any expectation of being able to make use of a proper fractional hydraulic pressure. Even by use of such manifolding expedients extreme difficulty is experienced in maintaining the fractional bleed-off pressure at a steady and dependable amount especially under circumstances where the main source of hydraulic power may be many times greater in pressure than the pressure made use of in a particular instance. Furthermore, the mechanisms currently in use are so involved and complicated that in frequent instances either the cost is prohibitive or on certain pieces of machinery the installation is so cumbersome that many portions of structural design must be dispensed with or the machine especially built with otherwise unnecessary additions in order to accommodate the hydraulic control mechanism.

It is therefore among the objects of the invention to provide a new and improved fraction bleed-off hydraulic valve device by means of which a selected relatively low pressure hydraulic supply may be accurately and dependably bled off a main hydraulic source of pressure many times more than the pressure sought to be used.

Another object of the invention is to provide a new and improved proportioning hydraulic valve device adapted to redirect a fraction of the available hydraulic pressure which is simple in structure, thereby incorporating many advantages in construction and assembly as well as incorporating comparable advantages in maintenance.

Still another object of the invention is to provide a new and improved proportioning hydraulic valve device for making use of a fraction of an available source of hydraulic pressure, which is compact in proportion to the capacities of hydraulic pressure handled and number of fractional bleed-off passages employed and which is correspondingly inexpensive and economical in first cost as well as operation.

Still further among the objects of the invention is to provide a new and improved fractional or proportional hydraulic valve device which is positive and dependable in its operation in that it is capable of bleeding off very small proportions or fractions when needed from a main source of hydraulic power under relatively high pressure, thereby making possible use of an indefinite number of hydraulically actuated elements in a set-up of machinery without it being necessary to provide any more than a single source of hydraulic pressure under no more than one pressure setting.

With these and other objects in view, the invention consists in the construction, arrangement and combination of the various parts of the device whereby the objects contemplated are attained, as hereinafter set forth, pointed out in the appended claims and illustrated in the accompanying drawings.

Figure 1:
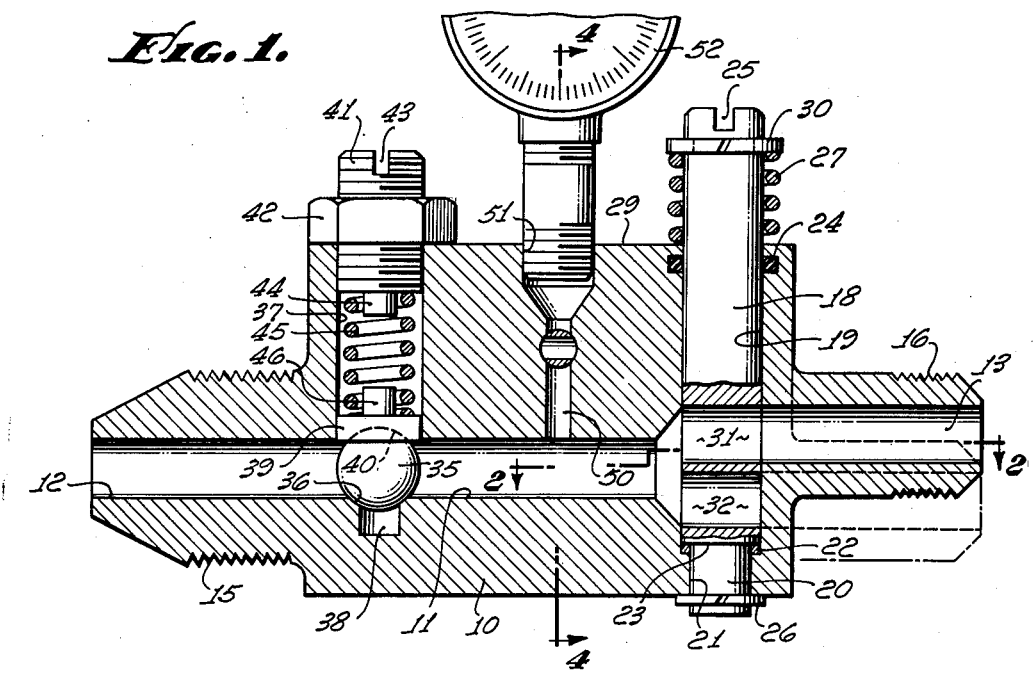
FIGURE 1 is a vertical sectional view taken lengthwise through one form of the invention.

In one embodiment of the invention chosen for the purpose of illustration there is shown a valve body, indicated generally by the reference character 10, within which a bore 11 extends axially therethrough. The bore 11 has an inlet passage 12 at one end and at the other end in the embodiment shown has a pair of outlet passages 13 and 14. At the inlet end is a threaded fitting 15 and at the outlet ends respectively are threaded fittings 16 and 17, these being of some conventional nature by means of which appropriate hydraulic tubing can be connected to the valve device.

To divide, proportion, or fraction the flow of hydraulic fluid under pressure which reaches the bore 11 through the inlet passage 12, there is provided in the embodiment herein described a valve element 18, cylindrical in form and rotatably mounted in an appropriate hole 19. The valve element has a reduced end 20 received in a recess 21 of comparable size to the end that a packing 22 is adapted to seal the valve element at a shoulder 23. A packing 24, here shown as comprising an O-ring packing medium, is shown at the upper end of the valve element in its mounting. A screw-driver slot 25 may be provided for adjusting the rotational position of the valve element. A split ring 26 is shown acting in the customary fashion to retain the valve element in position and a spring 27 retained against the upper face 29 of the body by means of a split ring 30 serves as a resistance to prevent inadvertent rotation of the valve element.

Figure 2:
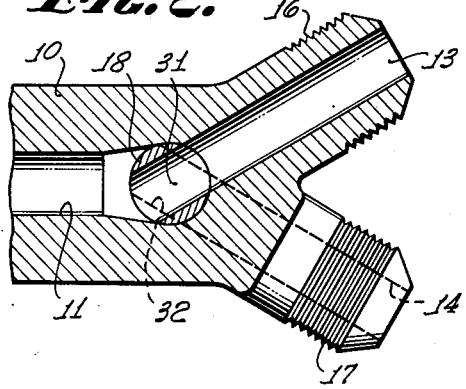
FIGURE 2 is a fragmentary cross-sectional view taken on the line 2—2 of FIGURE 1 with the proportioning valve in one position.
Figure 4:
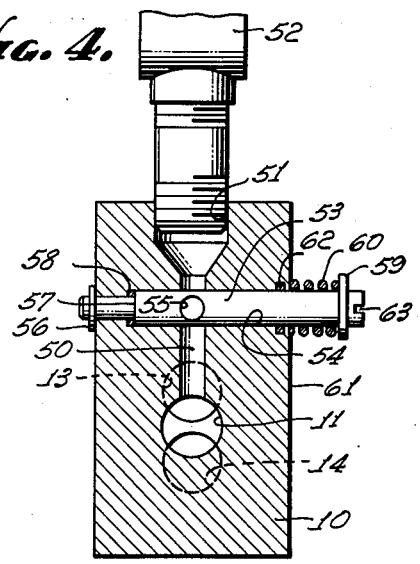
FIGURE 4 is a vertical cross-sectional view taken on the line 4—4 of FIGURE 1.
Figure 3:
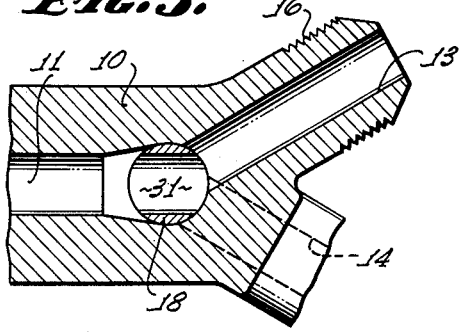
FIGURE 3 is a view similar to FIGURE 2 with the proportioning valve in a second position.

In the valve element are transverse valve passages 31 and 32, the passage 31 being above the passage 32. As shown in FIGURES 2 and 3 the axes of the passages are at an angular disposition relative to each other. Both valve passages 31 and 32 communicate with the bore 11, whereas the passage 31 communicates only with the outlet passage 13 at its opposite end and the passage 32 communicates only with the outlet passage 14 at its opposite end. It will be noted especially by reference to FIGURE 2 that when the valve passage 31 is at full open position passing a maximum available amount of hydraulic liquid pressure to the outlet passage 13, the passage 32 is closed with respect to the outlet passage 14.

By rotation of the valve element 18, however, it will be noted, especially by reference to FIGURE 3, that the outlet passage 13 may be partially closed to any degree and that when partially closed the outlet passage 14 is partially opened to a corresponding degree. In other words, the valve passages 31 and 32 are so arranged that the available hydraulic pressure at a selected or set capacity is always passed through the outlet passages but may be proportioned or fractioned between the outlet passages so that, for example, if one passage is passing twenty-five percent of the available capacity, the other is passing seventy-five percent and vice versa. Similarly either one of the passages may be shut off entirely at the same time the other is opened to full position. Consequently there is an infinitely variable adjustment with respect to either of the outlet passages between zero and capacity. It is further significant that the capacity or size of one only of the outlet passages and communicating transverse passage is substantially the same as the capacity or size of the bore 11.

In order that the hydraulic pressure at a selected desired amount will be delivered in a dependable fashion to the selected outlet passage, there is provided a pressure control valve means comprising essentially a ball valve 35 adapted to seat upon an annular valve seat 36. So that the pressure control valve device will function properly there is provided a hole 37 slightly larger in diameter than the diameter of the bore 11. Opposite the hole and in axial alignment therewith is a recess 38 in the wall of the bore, the rim of which forms the seat 36 already identified. It should be noted that the diameter of the ball valve 35, here shown as a perfect sphere, is greater than the diameter of the bore 11 by a slight amount and slightly less than the diameter of the hole 37 so that the ball valve can be injected into position through the hole 37.

To manipulate the ball valve there is provided a bushing or piston 39 which is adapted to slidably fit within the hole 37. In the bushing is a semi-spherical hollow or recess 40 which is adapted to receive a portion of the ball valve 35.

A threaded valve adjusting stem 41 is threadedly received in the upper end of the hole 37 and is provided with a lock nut 42. A screw-driver slot 43 assists in manipulation of the adjusting stem. At the lower end of the stem is a knob 44 serving as a spring keeper for the upper end of a spring 45 and a knob 46 on the bushing 39 serves as a spring keeper for the lower end of the spring.

Performance of the ball valve is improved by making the seat 36 relatively wide and in conformance with the spherical shape of the ball. The semi-spherical recess 40 is also significant in that it permits unrestricted rotation of the ball valve 35 thereby to assure a balanced load on all sides of the spring 45 at all times.

In order to accurately determine the pressure present in that portion of the bore 11 between the ball valve element 35 and the valve element 18 there is provided a gage passage 50 which communicates between the bore 11 and a threaded gage recess 51, in which a conventional pressure gage 52 is mounted. A shut-off valve element 53 is rotatably mounted in an opening 54 and has a valve passage 55 extending transversely therethrough. The shut-off valve element is secured at one end by a split ring 56 which serves to confine a shoulder 57 of the valve element upon a packing 58. At the other end a split ring 59 confines a spring 60 against a face 61 of the body so as to provide a resistance to rotation of the valve element. An O-ring seal 62 may be employed around the valve element and a screw-driver slot 63 provided to assist in adjustment.

In the operation of this form of the invention it may be assumed that the inlet passage 12 is connected to a source of hydraulic power under relatively high pressure and for example in the neighborhood of a pressure of 500 pounds per square inch. Where it might be desired to operate a hydraulic cylinder, ram, motor, or other hydraulic appurtenance at a pressure of 50 pounds per square inch, obviously the 500 pound per square inch source of pressure could not be tapped without reducing the pressure to the 50 pound per square inch level. In applicant's device this is accomplished by initially setting the valve element 18 at some chosen position wherein all of the hydraulic liquid capable of being passed by the valve element 18 is directed to either one or the other or in the aggregate to both of the outlet passages 13 and 14. The gage 52 will then be placed in operation by opening the shut-off valve element 53, at which time the valve stem 41 is adjusted, thereby to properly position the ball valve 35 in order that pressure within the bore 11 be set at a gage pressure comparable to that desired for a particular low pressure hydraulic appurtenance. If, for example, the appurtenance is fed from the outlet passage 13, the outlet passage 14 will be connected back to the reservoir which supplies the primary source of hydraulic power.

It may then be desirable to so adjust the valve element 18 that a desired flow of hydraulic liquid reaches the selected hydraulic appurtenance. This may be a setting like that illustrated in FIGURE 3 on some occasions, in which event that portion of the hydraulic liquid capable of being passed through the valve which does not flow to the outlet passage 13 will be diverted to the outlet passage 14. At this point the gage 52 can again be checked and some slight readjustment made on the valve stem 41. Thereafter the lock nut 42 is screwed tight and the gage shut off by manipulation of the shut-off valve 53. Once the setting is made, the gage may be removed and the valve device described is sufficiently dependable with respect to setting and performance that the desired fractioning or proportioning will continue as long as there is hydraulic pressure available at the inlet passage 12 to effect performance.

Figure 5:
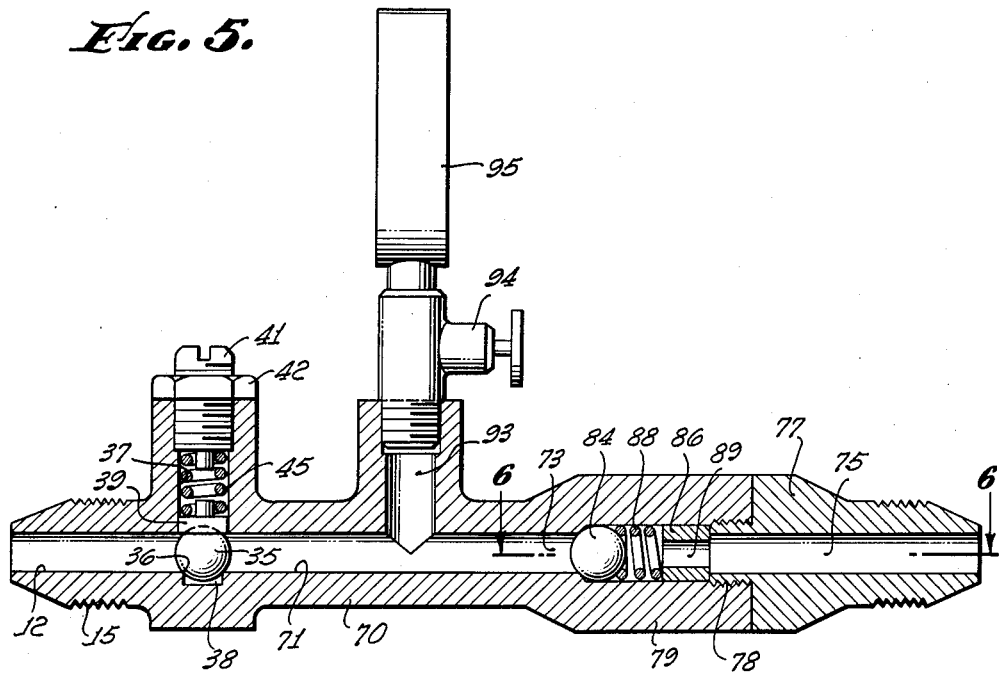
FIGURE 5 is a longitudinal sectional view taken lengthwise through another form of the invention.
Figure 6:
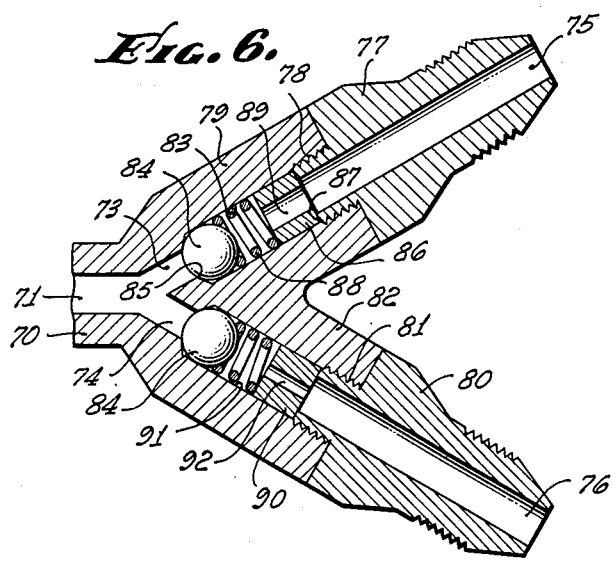
FIGURE 6 is a fragmentary horizontal sectional view taken on the line 6—6 of FIGURE 5.

In the form of device illustrated in FIGURE 5 a similar valve body 70 is provided through which extends a bore 71 in an axial direction. An inlet passage 72 is adapted to connect the bore to a source of hydraulic power. From the opposite end of the bore are two branch outlet lines 73 and 74 which supply respectively outlet passages 75 and 76. For convenience a fitting 77 may be provided in which the outlet passage 75 is located and the fitting threadedly engaged by means of threads 78 to an appropriate boss 79 of the valve body. A similar fitting 80 provides for the outlet passage 76 and is attached by threads 81 to a boss 82.

A recess 83 interconnects the outlet line 73 with the outlet passage 75 and provides a space for accommodating a ball check 84. The ball check is adapted to seat against a seat 85.

Located also within the recess 83 is an orifice bushing 86 which is adapted to rest against an orifice seat or shoulder 87. The orifice bushing assists in maintaining a spring 88 in position to press against the ball valve 84. A flow restricting orifice 89 extends through the orifice bushing and determines the size of the available passageways to the outlet passage 75. Similarly an orifice bushing 90 is mounted in a recess 91 between the outlet line 74 and outlet passage 76. A flow-restricting orifice 92 determines the available capacity of the passageway outwardly to the outlet passage 76. In this form of the device the capacities of the flow-restricting orifices 89 and 92 are adjusted with respect to each other so that the aggregate capacity of the two is equal to the capacity of the valve device of this form of the invention. Should it be desired to pass all of the available hydraulic pressure to one of the outlet passageways, the orifice bushing in the other may be replaced by a solid block. Similarly any proportioning can be accomplished by selecting the flow-restricting orifice sizes so that the size desired is used with the outlet passageway feeding the hydraulic appurtenance whereas the other will accommodate the passage back to the reservoir.

In this form of the device similarly there is provided a gage passage 93 which communicates through a shut-off valve 94 with a gage 95. In this instance the gage and its valve may constitute a commercially available unit.

The pressure in the bore 71 in this form of the device is controlled by a pressure regulating valve means which can be identical to that described in connection with the form of device of FIGURE 1 and as a consequence corresponding reference characters have been employed.

By providing the structure herein described, it will be found that regardless of the pressure present at the inlet passage 12 or 72, as the case may be, the pressure can be very accurately determined within the bore 11 or 71 by manipulation of the ball valve 35. This valve fits within the bore with a clearance and arrangement such that a very precise setting can be achieved. Spring pressure exerted by the spring 45 tending to move the ball valve toward its seat 36 serves as an effective regulator to maintain the pressure within the bore at a selected amount. Such hydraulic liquid as might tend to by-pass around the sides of the ball valve is of minor consequence and does not affect the dependability of the setting. When the setting determined in this fashion is correlated with the desired outlet passage, a proper flow to the outlet passage is assured at all times because the surplus is by-passed through the other outlet passage and flows freely back to the reservoir. The device thus described is particularly compact and dependable for the reasons defined and accordingly can be built into machinery where such functioning is needed and there left with assurance that it will perform faithfully and effectively at all times. Although only one pair of outlet passages is shown leading from the bore 11 or 71, as the case may be, it will be readily apparent that such pairs of outlet passages can be multiplied and arranged as desired with the aid of the combination disclosed herein.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

Having described my invention, what I claim as new and desire to secure by Letters Patent is:

1. A fraction bleed-off hydraulic valve device for a bleed-off supply comprising a valve body having a bore with an inlet passage adapted for connection to a source of hydraulic fluid in quantity and pressure exceeding the maximum demand for said bleed-off supply, a plurality of outlet passages communicating with the bore, at least one of said outlet passages having a capacity in excess of said maximum demand, fractional flow proportioning elements adapted for insertion between said bore and said respective outlet passages in the path of hydraulic fluid flow, said elements having individually variable capacities and having combined capacities when in operable position substantially equal to the capacity of said one of said outlet passages, and a regulator valve comprising a valve element in said bore, a valve seat in the bore operably associated with said valve element, yieldable means acting against the valve element, adjusting means on the body operably associated with said yieldable means and accessible from the exterior of the body, said adjusting means being adapted to set the valve element whereby to control the pressure in said one of said outlet passages.

2. A fraction bleed-off hydraulic valve device for a bleed-off supply comprising a valve body having an axial bore with an inlet passage adapted for connection to a source of hydraulic fluid in quantity and pressure exceeding by several times the maximum demand for said bleed-off supply, a pair of outlet passages communicating with the axial bore, each of said outlet passages having a capacity in excess of said maximum demand, fractional flow proportioning elements adapted for insertion between said bore and said respective outlet passages in the path of hydraulic fluid flow, said elements having individually variable capacities and having combined capacities when in operable position substantially equal to the capacity of each separate outlet passage, and a regular valve device in said body comprising means forming a hole through said body transverse to and in communication with said bore, said hole having a diameter greater than said bore, a ball valve element in said bore having a diameter less than said hole and greater than said bore, an annular valve seat in the wall of the bore in axial alignment with said hole operably associated with said valve element, a piston slidably mounted in said hole, a recess in said piston receptive of said ball valve, a spring keeper on the side of said piston opposite said recess and a spring in the bore having one end in engagement with said keeper, a spring pressed valve actuator operably associated with said spring at the other end, and an adjustor on the actuator accessible from the exterior of the body adapted to set the valve element whereby to control the pressure in said one of said outlet passages.

3. A fraction bleed-off hydraulic valve device for a bleed-off supply comprising a valve body having an axial bore with an inlet passage adapted for connection to a source of hydraulic fluid in quantity and pressure exceeding by several times the maximum demand for said bleed-off supply, a pair of outlet passages communicating with the axial bore, each of said outlet passages having a capacity in excess of said maximum demand, fractional flow proportioning elements adapted for insertion between said bore and said respective outlet passages in the path of hydraulic fluid flow, said elements having individually variable capacities and having combined capacities when in operable position substantially equal to the capacity of each separate outlet passage, and a regular valve device in said bore comprising a ball valve element having a portion of maximum diameter substantially equal in cross-sectional area to the cross-sectional area of said bore, means forming a hole in said body transverse with and in communication with said bore, an annular valve seat in the wall of the bore in axial alignment with said hole and operably associated with said ball valve element, a spring pressed valve actuator operably associated with said ball valve element and comprising a piston slidably mounted in the hole, said piston having a recess receptive of a portion of said valve of diameter less than said maximum diameter, and an area around the recess exposed to pressure in said inlet passage, an adjustor on the actuator accessible from the exterior of the body adapted to set the valve element whereby to control the pressure in the bore and in a selected one of said outlet passages, and a valve actuated pressure gage attachment in communication with the bore adapted to facilitate a determination of the pressure in said bore and said outlet passages.

4. A fraction bleed-off hydraulic valve device comprising a valve body having a bore therein, an inlet passage for the bore and a plurality of outlet passages from the bore, a pressure control valve means extending transversely of the bore and comprising means forming a hole of diameter greater than the diameter of the bore communicating with the bore and with axes of said hole and said bore intersecting, means forming a recess in the wall of said bore in axial alignment with the hole and an annular valve seat around said recess, a ball valve element having a diameter greater than said bore and less than said hole adapted to engage said seat, a bushing slidably mounted in said hole and having a semi-spherical recess receptive of a portion of said ball valve element and of diameter less than the diameter of the ball valve element, and an annular area on said bushing surrounding said recess, an adjusting stem threadedly engaged in an outer end of said hole and a spring compressed between said bushing and said stem, and a fractional flow proportioning device between said bore and said outlet passages comprising means forming a valve element recess communicating with said bore, a proportioning valve element operably mounted in said recess, and a passage means through said proportioning valve element adapted to communicate between the bore and the respective outlet passages, said passage means being at a directional disposition whereby the passage means to either outlet passage is open at a fraction of capacity when the passage means is open at the remaining fraction of capacity.

5. A regulating valve comprising a body having a bore therethrough, a valve seat in the wall of said passage, a ball valve element in the passage operably mounted on the seat, means forming a hole in the body in axial alignment with the seat and comumnicating with the bore, a bushing having a free sliding mounting in the inner end of the hole and having a semi-spherical recess having a diameter less than the diameter of said ball valve element receptive of a portion of said ball valve element, a portion of said bushing being exposed to said bore, a projection on the side of said bushing opposite said recess forming a spring keeper, an adjusting screw at the end of said hole opposite from said bushing and spaced therefrom and having a projection at the inner end thereof forming a spring keeper, and a compression spring compressed between said bushing and said screw and the respective spring keepers thereon subject to adjustment by said screw to vary the setting of said ball valve element.

6. A fraction bleed-off hydraulic valve device comprising a valve body having a bore therein, an inlet passage for the bore and a pair of outlet passages from the bore, and a fractional flow proportioning device between said bore and said outlet passages comprising means forming a valve element recess communicating with said bore, a cylindrical proportioning valve element rotatably mounted in said recess, and a pair of valve passages through said proportioning valve element, each of said passages being adapted to communicate between the bore and one of said outlet passages, said valve passages being at an angular disposition relative to each other whereby the valve passage to either outlet passage is open at a fraction of capacity when the outlet passage to the other outlet passage is open at the remaining fraction of capacity.

7. A fraction bleed-off hydraulic valve device comprising a valve body having an axial bore therein, an inlet passage for the bore at one end and a pair of outlet passages at the other end having axes thereof in different planes, a pressure control valve means extending transversely of the bore and comprising means forming a hole of diameter greater than the diameter of the bore and communicating with the bore and with axes of said hole and said bore intersecting, means forming a recess in the wall of said bore in axial alignment with the hole and an annular valve seat around said recess, a ball valve element having a diameter greater than said bore and less than said hole in engagement with said seat, a bushing slidably mounted in said hole and having a semi-spherical recess of diameter less than the diameter of said ball valve element receptive of a portion of said ball valve element, an annular area surrounding said recess, an adjusting stem threadedly engaged in an outer end of said hole at a location spaced from said bushing and a spring compressed between said bushing and said stem, and a fractional flow proportioning device between said bore and said outlet passages comprising means forming a valve element recess in communication with said bore with axes of said recess and said bore intersecting, a cylindrical proportioning valve element rotatably mounted in said recess, and a pair of valve passages through said proportioning valve element, each passage being adapted to communicate between the bore and one only of the respective outlet passages, said valve passages being at an angular disposition relative to each other whereby the valve passage to either outlet passage is open at a fraction of capacity when the outlet passage to the other outlet passage is open at the remaining fraction of capacity in accordance with a rotational setting of said proportioning valve element.

8. A fraction bleed-off hydraulic valve device comprising a valve body having an axial bore therein, an inlet passage for the bore at one end and a pair of outlet passages at the other end, each passage being of a size adapted to pass a selected maximum flow less than the capacity of said bore, means forming a hole in the body communicating between the exterior and said bore, a pressure control valve means extending through the hole into the bore and comprising a valve element in the bore, a bushing slidably mounted in the hole and in engagement with said valve element and having a portion thereof exposed within said bore, a valve seat in said bore, said valve element being in engagement with said seat, an adjusting stem in the body spaced from said bushing and a spring connection between said bushing and said stem, and a fractional flow proportioning means between said bore and said outlet passages comprising an orifice bushing seat in each outlet passage, a flow-restricting orifice bushing in each passage, said bushings having flow-restricting orifice openings therethrough related in flow capacity such that when in place the orifice opening of one bushing is of one fraction of maximum capacity when the orifice opening of the other bushing is of the remaining fraction of maximum capacity, said bushings being adapted for removal for substitution of bushings of different relative capacities.

9. A fraction bleed-off hydraulic valve device comprising a valve body having an axial bore therein, an inlet passage for the bore at one end and a pair of outlet passages at the other end each of a size adapted to pass a selected maximum flow less than the capacity of said bore, means forming a hole in the body communicating between the exterior and said bore, a pressure control valve means extending through said hole into the bore and comprising a valve element in the bore, a valve seat in said bore, said valve element being in engagement with said seat, a bushing slidably mounted in said hole and in engagement with a portion of said valve element, a portion of said bushing being exposed to said bore, an adjusting stem in said body spaced from said bushing and a spring connection between said bushing and said stem, and a fractional flow proportioning means between said bore and said outlet passages comprising an orifice bushing seat in each outlet passage, a check valve seat in each outlet passage, a ball check valve on each check valve seat, a flow-restricting orifice bushing in each passage on the respective bushing seat and springs between the respective ball check valves and orifice bushings, said bushings having flow-restricting orifice openings therethrough related in flow capacity such that when in place the orifice opening of one bushing is of one fraction of capacity and the orifice opening of the other bushing is of the remaining fraction of capacity, said bushings being adapted for removal for substitution of bushings of different relative capacities.

References Cited in the file of this patent
UNITED STATES PATENTS

| | | |
|---|---|---|
| 1,098,203 | Williams | May 26, 1914 |
| 1,105,547 | Coffield et al. | July 28, 1914 |
| 1,244,382 | Slinack | Oct. 23, 1917 |
| 1,640,620 | Schaff | Aug. 30, 1927 |
| 1,997,365 | Howard | Apr. 9, 1935 |
| 2,317,927 | Loftus | Apr. 27, 1943 |